US010055879B2

(12) United States Patent
Wang et al.

(10) Patent No.: US 10,055,879 B2
(45) Date of Patent: Aug. 21, 2018

(54) 3D HUMAN FACE RECONSTRUCTION METHOD, APPARATUS AND SERVER

(71) Applicant: TENCENT TECHNOLOGY (SHENZHEN) COMPANY LIMITED, Shenzhen (CN)

(72) Inventors: Chengjie Wang, Shenzhen (CN); Jilin Li, Shenzhen (CN); Feiyue Huang, Shenzhen (CN); Lei Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/652,009

(22) Filed: Jul. 17, 2017

(65) Prior Publication Data

US 2017/0316598 A1    Nov. 2, 2017

Related U.S. Application Data

(63) Continuation of application No. PCT/CN2016/081452, filed on May 9, 2016.

(30) Foreign Application Priority Data

May 22, 2015   (CN) .......................... 2015 1 0268521

(51) Int. Cl.
*G06T 15/10* (2011.01)
*G06T 7/73* (2017.01)
*G06T 15/04* (2011.01)

(52) U.S. Cl.
CPC ............... *G06T 15/10* (2013.01); *G06T 7/73* (2017.01); *G06T 15/04* (2013.01); *G06T 2207/30201* (2013.01); *G06T 2215/16* (2013.01)

(58) Field of Classification Search
None
See application file for complete search history.

(56) References Cited

U.S. PATENT DOCUMENTS 6,806,898 B1 * 10/2004 Toyama .................. G06T 5/006
348/14.01
7,876,931 B2    1/2011 Geng
(Continued)

FOREIGN PATENT DOCUMENTS

CN      101404091      4/2009
CN      102054291      5/2011
(Continued)

OTHER PUBLICATIONS

International Search Report for International Application No. PCT/CN2016/081452 dated Aug. 12, 2016.

*Primary Examiner* — James A Thompson
(74) *Attorney, Agent, or Firm* — Knobbe Martens Olson & Bear LLP

(57) ABSTRACT

A 3D human face reconstruction method and apparatus, and a server are provided. In some embodiments, the method includes determining feature points on an acquired 2D human face image; determining posture parameters of a human face according to the feature points, and adjusting a posture of a universal 3D human face model according to the posture parameters; determining points on the universal 3D human face model corresponding to the feature points, and adjusting the corresponding points in a sheltered status to obtain a preliminary 3D human face model; and performing deformation adjusting on the preliminary 3D human face model, and performing texture mapping on the deformed 3D human face model to obtain a final 3D human face.

13 Claims, 6 Drawing Sheets

(56) References Cited

U.S. PATENT DOCUMENTS

| | | | | |
|---|---|---|---|---|
| 2004/0136574 | A1* | 7/2004 | Kozakaya | G06K 9/00228 382/118 |
| 2009/0310828 | A1* | 12/2009 | Kakadiaris | G06K 9/00208 382/118 |
| 2011/0254942 | A1* | 10/2011 | Suzuki | G06K 9/00221 348/77 |
| 2012/0177283 | A1* | 7/2012 | Wang | G06T 17/00 382/154 |
| 2012/0183238 | A1* | 7/2012 | Savvides | G06K 9/00201 382/285 |
| 2013/0201187 | A1* | 8/2013 | Tong | G06T 17/00 345/420 |
| 2013/0321412 | A1* | 12/2013 | Coon | G06T 17/00 345/420 |

FOREIGN PATENT DOCUMENTS

| | | | | |
|---|---|---|---|---|
| CN | 102081733 | | 6/2011 | |
| CN | 103116902 | | 5/2013 | |
| CN | 104036546 | | 9/2014 | |
| CN | 104036546 A | * | 9/2014 | G06T 17/00 |
| CN | 104966316 | | 10/2015 | |

* cited by examiner

US 10,055,879 B2

3D HUMAN FACE RECONSTRUCTION METHOD, APPARATUS AND SERVER

CROSS REFERENCE TO RELATED APPLICATION

The present application is a continuation of International Application No. PCT/CN2016/081452, titled "3D HUMAN FACE RECONSTRUCTION METHOD, APPARATUS AND SERVER", filed on May 9, 2016, which claims the priority to Chinese Patent Application No. 201510268521.X, entitled "3D HUMAN FACE RECONSTRUCTION METHOD, APPARATUS AND SERVER", filed on May 22, 2015 with the State Intellectual Property Office of the People's Republic of China, both of which are incorporated herein by reference in their entireties.

TECHNICAL FIELD

The present disclosure relates to the field of computer technology, and in particular to a three-dimensional (3D) human face reconstruction method, an apparatus, and a server.

BACKGROUND

In recent years, with the development of face recognition technology, human face video conference, 3D human face animation and virtual technology, 3D human face modeling has received more and more attention from researchers. Among other things, the 3D human face shape modeling is one of the key techniques for the 3D human face modeling.

At present, a 3D human face reconstruction method is mostly to collect multiple human face images from multiple angles, or collect a frontal human face image to obtain a 3D human face image, and to perform 3D human face reconstruction based on the 3D human face image. However, in a real scene, a frontal human face image cannot be collected in most cases. For example, in the face recognition, it is probable to only collect a side human face image. In this case, a 3D human face cannot be constructed by means of the conventional 3D human face reconstruction method, or the effect of the constructed 3D human face is poor.

SUMMARY

In view of the above, a three-dimensional (3D) human face reconstruction method, an apparatus, and a server are provided according to the present disclosure, to construct a 3D human face with a picture only including a side face of a human.

To achieve the above object, solutions are provided in the following.

A 3D human face reconstruction method includes obtaining a two-dimensional (2D) human face image for 3D human face reconstruction, and determining feature points on the 2D human face image. The feature points are representative of a human face contour. The method further includes determining posture parameters of a human face by using the feature points, and adjusting, based on the posture parameters, a posture of a general 3D human face model obtained in advance. The method further includes determining points on the general 3D human face model corresponding to the feature points, and adjusting the corresponding points in a blocking state to obtain a preliminary 3D human face model. The method further includes performing deformation adjusting on the preliminary 3D human face model to obtain a deformed 3D human face model, so that a positional relationship among the corresponding points on the deformed 3D human face model is consistent with a positional relationship among the feature points on the 2D human face image. The method further includes performing texture mapping on the deformed 3D human face model to obtain a 3D human face.

A 3D human face reconstruction apparatus includes an image feature point determining unit configured to obtain a 2D human face image for 3D human face reconstruction, and determine feature points on the 2D human face image, where the feature points are representative of a human face contour. The apparatus further includes a posture adjusting unit configured to determine posture parameters of a human face by using the feature points, and adjust, based on the posture parameters, a posture of a general 3D human face model obtained in advance. The apparatus further includes a feature point matching unit configured to determine points on the general 3D human face model corresponding to the feature points, and adjust corresponding points in a blocking state to obtain a preliminary 3D human face model. The apparatus further includes a model deforming unit configured to perform deformation adjusting on the preliminary 3D human face model to obtain a deformed 3D human face model, so that a positional relationship among the corresponding points on the deformed 3D human face model is consistent with a positional relationship among the feature points on the 2D human face image. The apparatus further includes a texture mapping unit configured to perform texture mapping on the deformed 3D human face model to obtain a 3D human face.

A server includes the above 3D human face reconstruction apparatus.

It can be seen from the above technical solutions, based on the 3D human face reconstruction method according to the embodiments of the present disclosure, feature points are determined on an obtained 2D human face image, posture parameters of a human face are determined based on the feature points, and a posture of a general 3D human face model is adjusted based on the posture parameters. Points corresponding to the feature points are determined on the general 3D human face model, and the corresponding points in a blocking state are adjusted to obtain a preliminary 3D human face model. Deformation adjusting is performed on the preliminary 3D human face model, and texture mapping is performed on the deformed 3D human face model to obtain a final 3D human face. The obtained 2D human face image in the present disclosure may be a side human face image, posture parameters of the side human face image are determined based on feature points, a posture of a general 3D human face model is adjusted to make the posture of the general 3D human face model consistent with a posture of a human face, and a 3D human face is obtained through subsequent processing. Since a shooting angle of a 2D image is not limited in the present disclosure, the robustness is higher, and the accuracy of face recognition is further improved.

BRIEF DESCRIPTION OF THE DRAWINGS

To illustrate technical solutions according to embodiments of the present disclosure or in the conventional technologies more clearly, drawings to be used in the descriptions of the embodiments or the conventional technologies are described briefly hereinafter. Apparently, the drawings described hereinafter are only for some embodi

DETAILED DESCRIPTION OF THE EMBODIMENTS

Technical solutions of the embodiments of the present disclosure are illustrated clearly and completely in conjunction with the following drawings of the embodiments of the present disclosure. Apparently, the described embodiments are merely a few rather than all of the embodiments of the present disclosure. All other embodiments obtained by those skilled in the art based on the embodiments of the present disclosure without creative efforts shall fall within the protection scope of the present disclosure.

Figure 1:
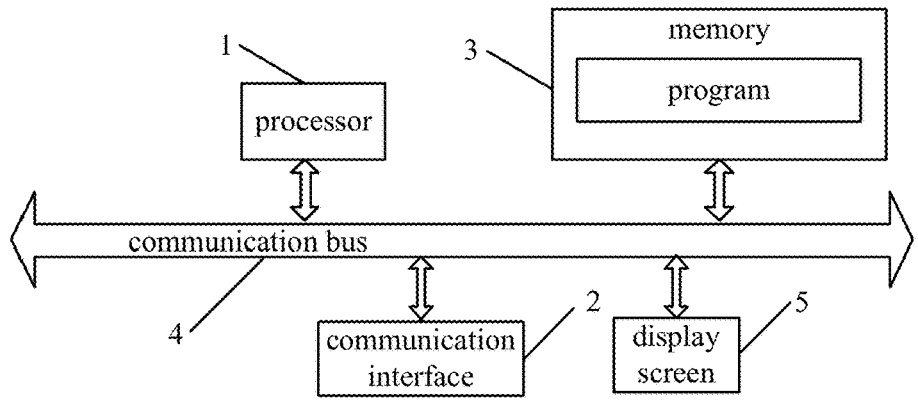
- FIG. 1 is a schematic structural diagram of hardware of a server according to an embodiment of the present disclosure.

A 3D human face reconstruction method according to the embodiments of the present disclosure is implemented on basis of a server, and the server may be a computer, a laptop, or the like. Before introducing the 3D human face reconstruction method according to the present disclosure, a hardware structure of the server is described. As shown in FIG. 1, the server may include a processor 1, a communication interface 2, a memory 3, a communication bus 4 and a display screen 5. The processor 1, the communication interface 2, the memory 3, and the display screen 5 communicate with each other via the communication bus 4.

Figure 2:
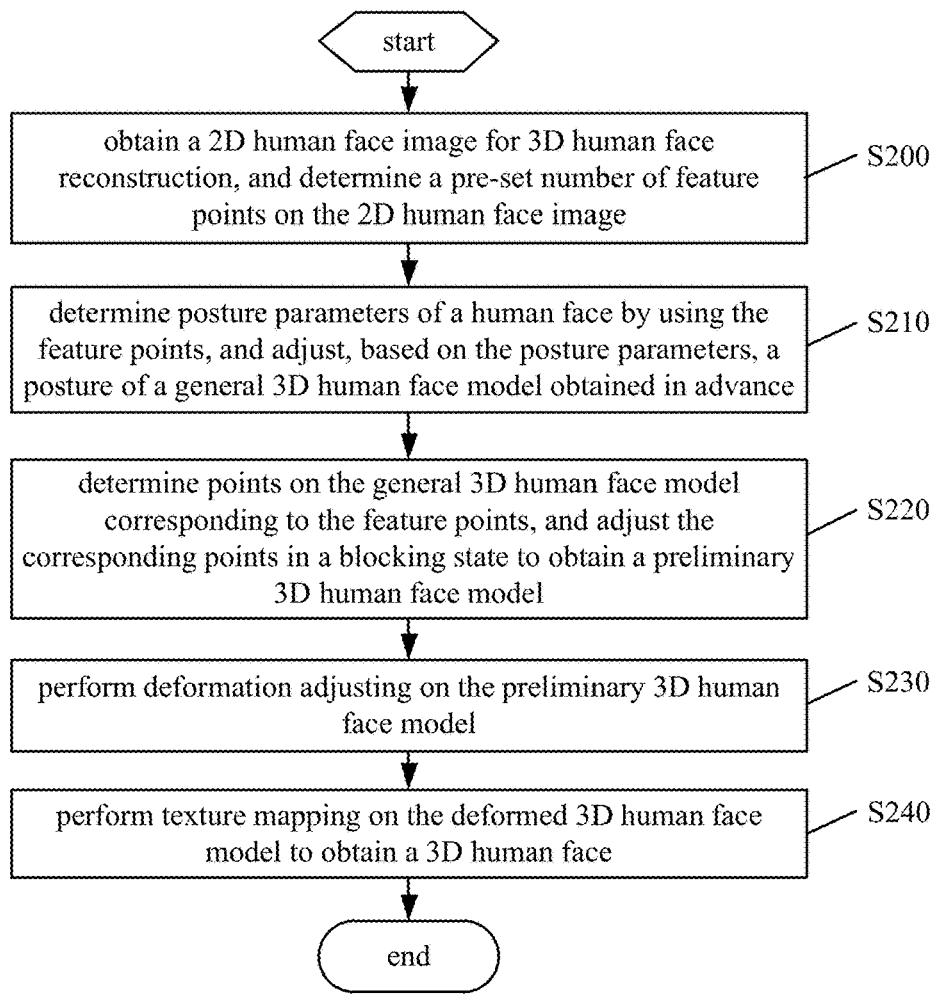
FIG. 2 is a flow chart of a 3D human face reconstruction method according to an embodiment of the present disclosure.

Hereinafter the 3D human face reconstruction method according to the present disclosure will be described in conjunction with the hardware structure of the server. As shown in FIG. 2, the method includes steps S200 to S240.

In step S200, a 2D human face image for 3D human face reconstruction is obtained, and a pre-set number of feature points are determined on the 2D human face image.

The 2D human face image may be obtained via the communication interface 2. Optionally, the communication interface 2 may be an interface of a communication module, such as an interface of a GSM module. The obtained 2D human face image may be stored in the memory 3, including a high-speed RAM memory, or a non-volatile memory, such as at least one disk memory.

Optionally, the obtained 2D human face image may be locally stored or downloaded from a network. A format of the image is not limited in the embodiment, which may be a JPEG format, a BMP format, or the like. The obtained 2D human face image in the present disclosure may not be a frontal human face image, but may be a human face image deviating from the frontal face at an angle. Optionally, in an embodiment, only two eyes on a human face may be visible in the 2D human face image.

Figure 3:
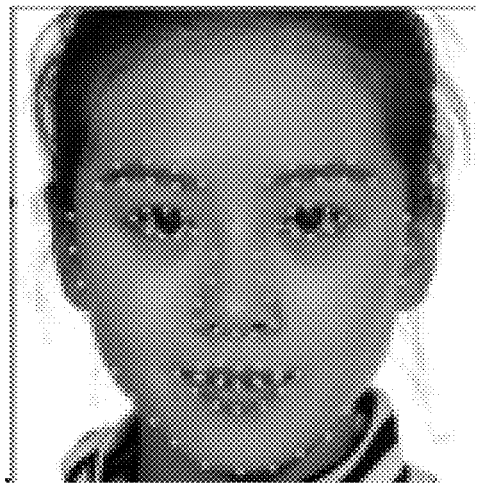
FIG. 3 is a schematic diagram of a method for selecting feature points of a 2D human face image according to an embodiment of the present disclosure.

The selected feature points may be pre-set number of points on the human face, and the number of the feature points may be more than one. The selected feature points are representative of a human face contour. Referring to FIG. 3, eyebrows, eyes, a nose, a mouth, a chin and both cheeks on a human face are better representative of a human face, and thus, these positions or several points on these positions may be determined as the feature points. The feature points may be determined in an automatic manner or in a manual manner. In the automatic manner, programs may be written based on some algorithms, and coordinates of the feature points may be automatically read from an image. In the manual manner, positions may be designated on the image manually.

In step S210, posture parameters of a human face are determined by using the feature points, and a posture of a general 3D human face model obtained in advance is adjusted based on the posture parameters.

This step may be executed by the processor 1. Codes corresponding to this step may be stored in the memory 3, and are called by the processor 1 to execute this step. The processor 1 may be a central processing unit (CPU), or an application specific integrated circuit (ASIC), or one or more integrated circuits configured to implement the embodiment of the present disclosure.

Figure 4:
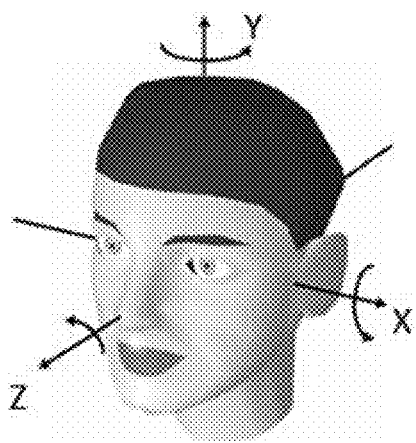
FIG. 4 is a schematic diagram of a rotation of a human face image in a spatial rectangular coordinate system according to an embodiment of the present disclosure.

The processor 1 may determine the posture parameters of the human face by using a positional relationship among the feature points. The posture parameters may be determined by a rotation direction and a rotation angle of the human face in a spatial rectangular coordinate system. Reference is made to FIG. 4. The posture parameters may be formed by the rotation angles of the human face along the X, Y and Z axes.

The posture of the general 3D human face model is adjusted according to the determined posture parameters of the human face image, so that the posture of the general 3D human face model is the same as the posture of the human face image.

In step S220, points corresponding to the feature points are determined on the general 3D human face model, and the corresponding points in a blocking state are adjusted to obtain a preliminary 3D human face model.

In an embodiment of the present disclosure, depth information of the corresponding points of the 3D human face model may be determined as depth information of the corresponding feature points.

This step may be executed by the processor 1. Codes corresponding to this step may be stored in the memory 3, and are called by the processor 1 to execute this step.

Since multiple feature points are generally provided, the processor 1 may obtain a series of corresponding points by marking points on the general 3D human face model corresponding to the feature points on the 2D human face image. The posture of the general 3D human face model is adjusted in step S210, i.e., if the 2D human face image is not a frontal human face image, the adjusted general 3D human face model is also not a frontal model. Therefore, among the corresponding points marked on the adjusted general 3D human face model, corresponding points on one side may be blocked. Such corresponding points in the blocking state may be adjusted by translation to make them visible. The preliminary 3D human face model is obtained by the adjusting.

In step S230, deformation adjusting is performed on the preliminary 3D human face model.

This step may be executed by the processor 1. Codes corresponding to this step may be stored in the memory 3, and are called by the processor 1 to execute this step.

The deformation adjusting is performed on the preliminary 3D human face model to obtain a deformed 3D human face model, so that a positional relationship among the corresponding points on the deformed 3D human face model is consistent with a positional relationship among the feature points on the 2D human face image. For example, with reference to the 2D human face image, the deformation adjusting is performed on the preliminary 3D human face model, to adjust a height and a width of the human face.

In step S240, texture mapping is performed on the deformed 3D human face model to obtain a 3D human face.

This step may be executed by the processor 1. Codes corresponding to this step may be stored in the memory 3, and are called by the processor 1 to execute this step.

A 3D face is mainly made up of geometric structure information and texture information. When a specific human face model is obtained by deformation, the geometric structure information of the human face is obtained. Then a lifelike 3D human face model is obtained by adding texture to the model by using a texture mapping technique. The final obtained 3D human face may be displayed on the screen 5.

Based on the 3D face reconstruction method according to the embodiment of the present disclosure, a pre-set number of feature points are determined on a obtained 2D human face image, posture parameters of a human face are determined based on the feature points and a posture of a general 3D human face model is adjusted based on the posture parameters. Points corresponding to the feature points are determined on the general 3D human face model, and the corresponding points in a blocking state are adjusted by translation to obtain a preliminary 3D human face model. Deformation adjusting is performed on preliminary 3D human face model, and texture mapping is performed on the deformed 3D human face model to obtain a final 3D human face.

The obtained 2D human face image in the present disclosure may be a side human face image, posture parameters of the side human face image are determined based on feature points, a posture of a general 3D human face model is adjusted to make the posture of the general 3D human face model consistent with a posture of a human face, and a 3D human face is obtained through subsequent processing. Since a shooting angle of a 2D image is not limited in the present disclosure, the robustness is higher, and the accuracy of face recognition is further improved.

Figure 5:
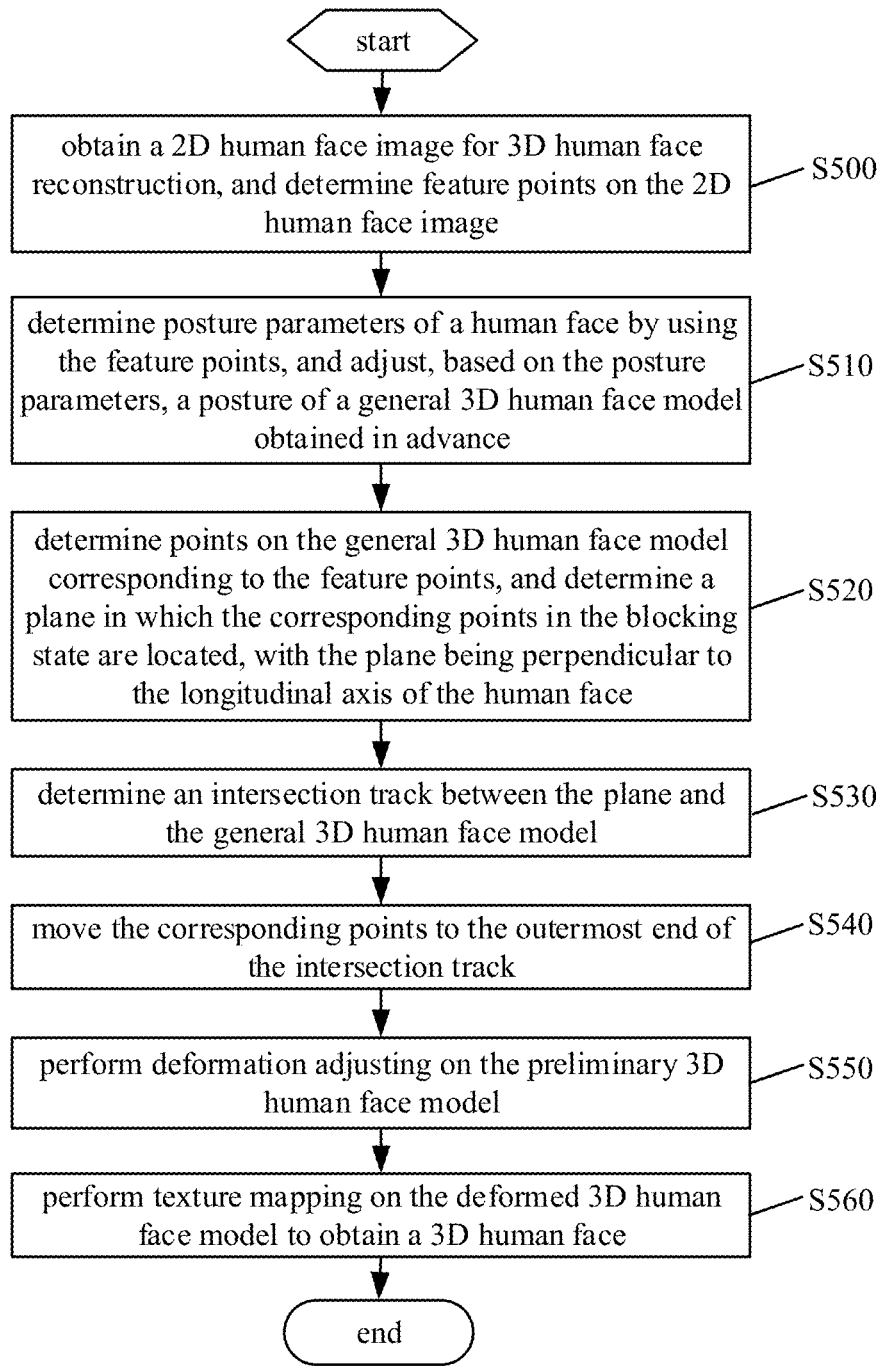
FIG. 5 is a flow chart of a 3D human face reconstruction method according to another embodiment of the present disclosure.

A 3D human face reconstruction method is provided according to another embodiment of the present disclosure, referring to FIG. 5.

As shown in FIG. 5, the method includes steps S500 to S560.

In step S500, a 2D human face image for 3D human face reconstruction is obtained, and feature points are determined on the 2D human face image.

In step S510, posture parameters of a human face are determined by using the feature points, and a posture of a general 3D human face model obtained in advance is adjusted based on the posture parameters.

In step S520, points corresponding to the feature points are determined on the general 3D human face model, and a plane in which the corresponding points in the blocking state are located is determined, with the plane being perpendicular to the longitudinal axis of the human face.

Reference is made to FIG. 4. When the human face rotates around the Y axis, the right cheek or the left cheek of the human face may be blocked. The plane in which the corresponding points in the blocking state are located is determined, with the plane being perpendicular to the Y axis.

In step S530, an intersection track is determined between the plane and the general 3D human face model.

Based on the plane determined in step S520, the intersection track is further determined between the plane and the general 3D human face model.

In step S540, the corresponding points are moved to the outermost end of the intersection track.

The corresponding points in the blocking state are moved to the outermost end of the intersection track determined in step S530. The outermost end of the intersection track may be regarded as a position on the protection of the general 3D human face model onto the plane furthest from the Y axis.

In step S550, deformation adjusting is performed on the preliminary 3D human face model.

In step S560, texture mapping is performed on the deformed 3D human face model to obtain a 3D human face.

In this embodiment, a specific implementation of performing translation adjusting on the corresponding points in the blocking state is described. The blocked corresponding points can be seen through the translation adjusting.

Figure 6:
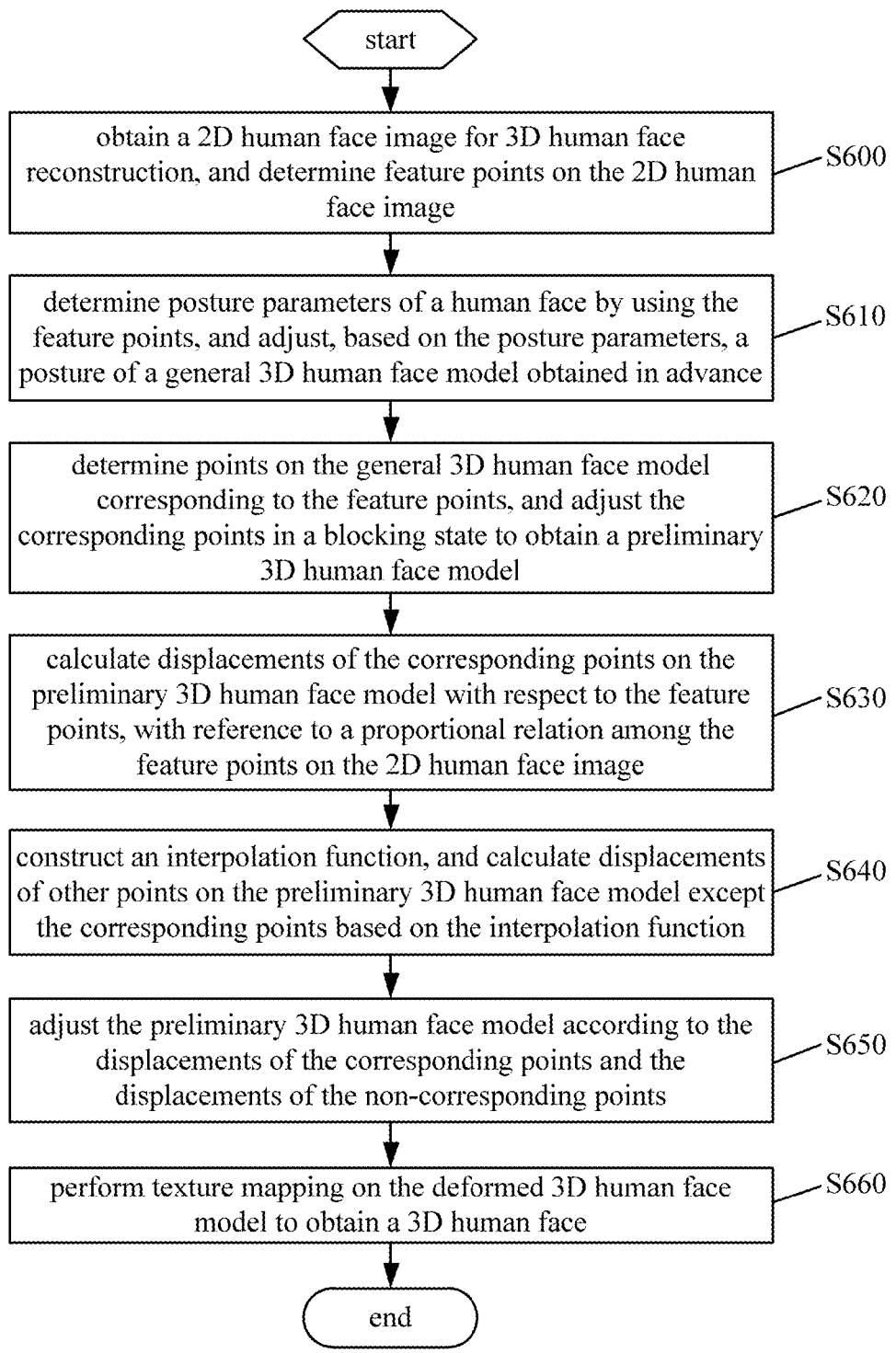
FIG. 6 is a flow chart of a 3D human face reconstruction method according to another embodiment of the present disclosure.

A 3D human face reconstruction method is provided according to another embodiment of the present disclosure, referring to FIG. 6.

As shown in FIG. 6, the method includes steps S600 to S660.

In step S600, a 2D human face image for 3D human face reconstruction is obtained, and feature points are determined on the 2D human face image.

In an embodiment of the present disclosure, the 2D human face image for 3D human face reconstruction is a 2D human face, and the number of the feature points may be more than one.

In step S610, posture parameters of a human face are determined by using the feature points, and a posture of a general 3D human face model obtained in advance is adjusted based on the posture parameters.

In step S620, points corresponding to the feature points are determined on the general 3D human face model, and the corresponding points in a blocking state are adjusted to obtain a preliminary 3D human face model.

In step S630, displacements of the corresponding points on the preliminary 3D human face model with respect to the feature points are calculated, with reference to a proportional relation among the feature points on the 2D human face image.

For ease of understanding, specific examples are described. It is assumed that, there are four points A, B, C and D on the 2D human face image, A is located in the middle of two eyebrows, B is located at the tip of the nose, C is located in the middle of the upper lip, and D is located on the chin. On the preliminary 3D human face model, points corresponding to A, B, C and D are respectively E, F, G and H. Taking a distance $L_{AB}$ between A and B as a datum, it is assumed that a distance between C and D is 0.3 $L_{AB}$. Further, it is determined that, on the preliminary 3D human face model, a distance between E and F is 0.9 $L_{AB}$, and a distance between G and H is 0.4 $L_{AB}$. It can be seen that, the distance between E and F should be increased by 0.1 $L_{AB}$, and the distance between G and H should be decreased by 0.1 $L_{AB}$.

In step S640, an interpolation function is constructed, and displacements of other points on the preliminary 3D human face model except the corresponding points are calculated based on the interpolation function.

The radial basis function may be used to construct the interpolation function. The displacements of the other points on the preliminary 3D human face model except the corresponding points are calculated based on the interpolation function.

In step S650, the preliminary 3D human face model is adjusted according to the displacements of the corresponding points and the displacements of the non-corresponding points.

The displacements of the points on the preliminary 3D human face model are obtained by step S630 and step S640. Further, the deformation adjusting is performed on the preliminary 3D human face model according to the displacements to obtain the deformed 3D human face model.

In step S660, texture mapping is performed on the deformed 3D human face model to obtain a 3D human face.

In this embodiment, a specific implementation of performing deformation adjusting on the preliminary 3D human face model is described. With the deformation of the preliminary 3D human face model, the human face model is closer to the practical situation.

In addition, it should be noted that, the texture mapping may be performed on the deformed 3D human face model by using a similarity-preserving mesh parameterization method.

The similarity-preserving mesh parameterization method is based on a relation between sides and angles of a triangle. If a ratio of lengths of two adjacent sides of a triangle A and an angle between the two adjacent sides of the triangle A are respectively the same to those of a triangle B, the triangle A is similar to the triangle B. With this theorem, a ratio of lengths of two adjacent sides and an angle between the two adjacent sides are constructed on a plane correspondingly to those on a 3D mesh, to build a set of global linear equations. The set of equations is solved to obtain a parameterized 2D planar mesh, and a mapping relation between vertexes of the model and vertexes of the triangles in the 2D plane is further obtained. The calculation in the method is simple and fast, and the parameterized triangle has small distortions. Therefore, the method can achieve a better texture mapping effect.

In the present disclosure, based on feature points on an obtained 2D human face image, posture parameters of the image may be determined. A posture of a general 3D human face model is adjusted based on the posture parameters, so that the posture of the general 3D human face model is consistent with a posture of a human face. Then a 3D human face is obtained through subsequent processing. Since a 3D human face can be reconstructed based on a 2D image, the speed of reconstructing the 3D face is further improved.

A 3D human face reconstruction apparatus according to an embodiment of the present disclosure will be described hereinafter, and the 3D human face reconstruction apparatus described hereinafter can refer to the 3D human face reconstruction method described in the above mutually and correspondingly. The 3D human face reconstruction apparatus according to the present disclosure can be applied to the server shown in FIG. 1.

Figure 7:
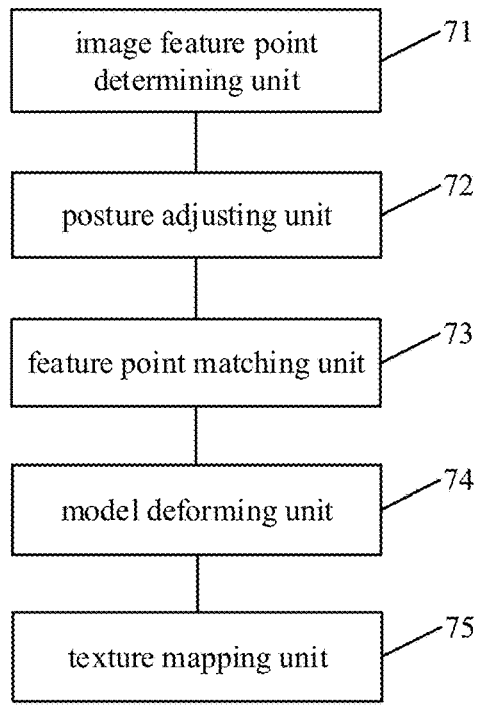
FIG. 7 is a schematic structural diagram of a 3D human face reconstruction apparatus according to an embodiment of the present disclosure.

Reference is made to FIG. 7, which is a schematic structural diagram of a 3D human face reconstruction apparatus according to an embodiment of the present disclosure.

As shown in FIG. 7, the device includes an image feature point determining unit 71, a posture adjusting unit 72, a feature point matching unit 73, a model deforming unit 74 and a texture mapping unit 75.

The image feature point determining unit 71 is configured to obtain a 2D human face image for 3D human face reconstruction, and determine feature points on the 2D human face image. The feature points are representative of a human face contour.

The posture adjusting unit 72 is configured to determine posture parameters of a human face by using the feature points, and adjust, based on the posture parameters, a posture of a general 3D human face model obtained in advance.

The feature point matching unit 73 is configured to determine points on the general 3D human face model corresponding to the feature points, and adjust corresponding points in a blocking state to obtain a preliminary 3D human face model.

The model deforming unit 74 is configured to perform deformation adjusting on the preliminary 3D human face model to obtain a deformed 3D human face model, so that a positional relationship among the corresponding points on the deformed 3D human face model is consistent with a positional relationship among the feature points on the 2D human face image.

The texture mapping unit 75 is configured to perform texture mapping on the deformed 3D human face model to obtain a 3D human face.

Figure 8:
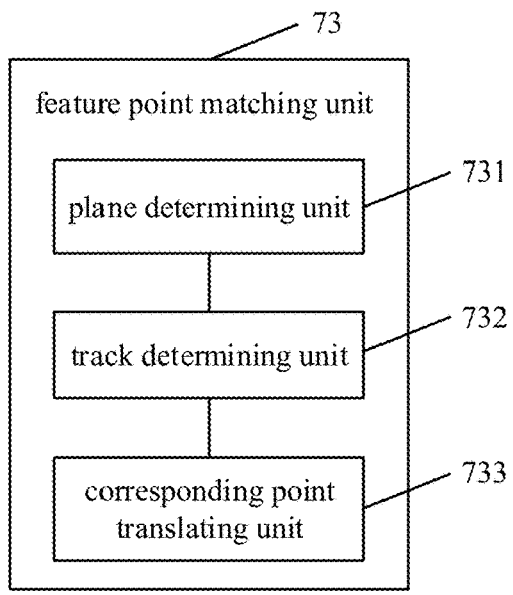
FIG. 8 is a schematic structural diagram of a feature point matching unit according to an embodiment of the present disclosure.

Optionally, an optional structure of the above feature point matching unit 73 is further provided according to an embodiment of the present disclosure. As shown in FIG. 8, the feature point matching unit 73 may include a plane determining unit 731, a track determining unit 732 and a corresponding point translating unit 733.

The plane determining unit 731 is configured to determine a plane in which the corresponding points in the blocking state are located, with the plane being perpendicular to the longitudinal axis of the human face.

The track determining unit 732 is configured to determine an intersection track between the plane and the general 3D human face model.

The corresponding point translating unit 733 is configured to move the corresponding points to the outermost end of the intersection track.

Figure 9:
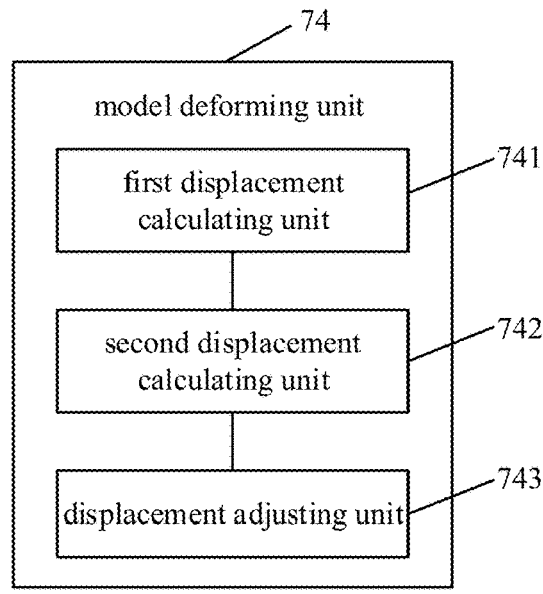
FIG. 9 is a schematic structural diagram of a model deforming unit according to an embodiment of the present disclosure.

Optionally, an optional structure of the above model deforming unit 74 is further provided according to an embodiment of the present disclosure. As shown in FIG. 9, the model deforming unit 74 may include a first displacement calculating unit 741, a second displacement calculating unit 742 and a displacement adjusting unit 743.

The first displacement calculating unit 741 is configured to calculate displacements of the corresponding points on the preliminary 3D human face model with respect to the feature points is calculated, with reference to a proportional relation among the feature points on the 2D human face image.

The second displacement calculating unit 742 is configured to construct an interpolation function, and calculate displacements of other points on the preliminary 3D human face model except the corresponding points based on the interpolation function. The radial basis function may be used to construct the interpolation function.

The displacement adjusting unit 743 is configured to adjust the preliminary 3D human face model according to the displacements of the corresponding points and the displacements of the non-corresponding points.

Optionally, the above texture mapping unit 75 may include a first texture mapping sub-unit configured to perform the texture mapping by using a similarity-preserving mesh parameterization method.

Based on the 3D human face reconstruction apparatus according to the embodiment of the present disclosure, feature points are determined on an obtained 2D human face image, posture parameters of a human face are determined based on the feature points, and a posture of a general 3D human face model is adjusted based on the posture parameters. Points corresponding to the feature points are determined on the general 3D human face model, and the corresponding points in a blocking state are adjusted by translation to obtain a preliminary 3D human face model. Deformation adjusting is performed on the preliminary 3D human face model, and texture mapping is performed on the deformed 3D human face model to obtain a final 3D human face. The obtained 2D human face image in the present disclosure may be a side human face image, posture parameters of the side human face image are determined based on feature points, a posture of a general 3D human face model is adjusted to make the posture of the general 3D human face model consistent with a posture of a human face, and a 3D human face is obtained through subsequent processing. Since a shooting angle of a 2D image is not limited in the present disclosure, the robustness is higher, and the accuracy of face recognition is further improved.

Figure 10:
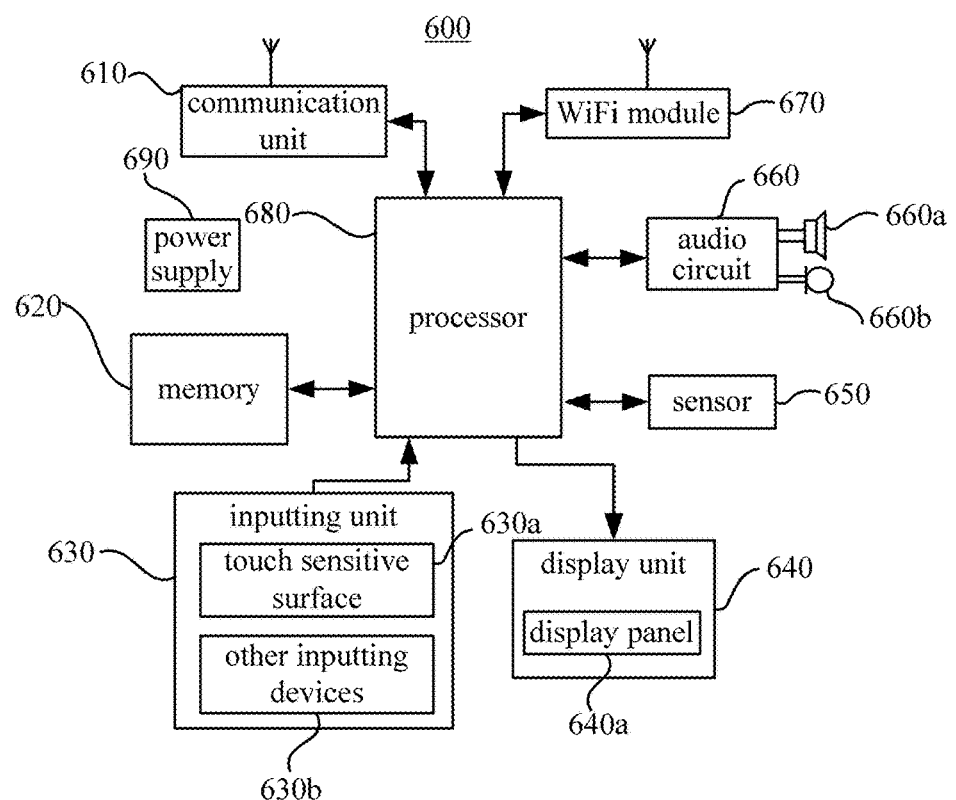
FIG. 10 is a schematic structural diagram of a 3D human face reconstruction terminal according to an embodiment of the present disclosure.

Referring to FIG. 10, a terminal 600 is provided according to another embodiment of the present disclosure. The terminal may include a communication unit 610, a memory 620 including one or more non-volatile readable storage media, an inputting unit 630, a display unit 640, a sensor 650, an audio circuit 660, a wireless fidelity (WiFi) module 670, a processor 680 including one or more processing cores, a power supply 690, and the like.

It can be understood by those skilled in the art that, the structure of the terminal illustrated in FIG. 10 is not limitation to the terminal, which may include more or less components as compared with the components illustrated in FIG. 10, or have some components combined, or use a different arrangement of the components.

The communication unit 610 may be configured to receive and transmit signals during the process of message communication or calling. The communication unit 610 may be a communication device, such as a Radio Frequency (RF) circuit, a router, and a modem. Specifically, if the communication unit 610 is the RF circuit, the communication unit 610 is configured to receive downlink information from a base station and transmit the downlink information to one or more processors 680 for processing. In addition, the RF circuit 610 may be configured to transmit data related to the uplink to the base station. Generally, the RF circuit, which serves as a communication unit, includes but is not limited to an antenna, at least one amplifier, a tuner, one or more oscillators, a subscriber identity module (SIM) card, a transceiver, a coupler, an LNA (Low Noise Amplifier), a duplexer and the like. In addition, the RF circuit 610 may communicate with the network and other devices through wireless communication. The wireless communication may be implemented by any communication standard or protocol, including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service) and the like. The memory 620 may be configured to store software programs and modules, which may be executed by the processor 680 to execute various applications as well as data processing. The memory 620 may mainly include a program storage region and a data storage region. In the program storage region, it may be stored operating systems, applications required for at least one function (such as a sound playback function and an image playback function) and the like. In the data storage region, it may be stored data created base on the using of the terminal 600 (such as audio data and phone book) and the like. In addition, the memory 620 may include a high-speed random access memory. The memory 620 may further include a non-volatile memory, such as at least one magnetic disk storage device, a flash memory device, or other non-volatile solid state memory device. Accordingly, the memory 620 may further include a memory controller to provide access to the memory 620 by the processor 680 and the inputting unit 630.

The inputting unit 630 may be configured to receive inputted digital or character information, and generate a keyboard signal input, a mouse signal input, an operating rod signal input, an optical signal input or a track ball signal input that are related to user settings and function control. Specifically, the inputting unit 630 may include a touch-sensitive surface 630a and other inputting devices 630b. The touch-sensitive surface 630a, also referred to as a touch screen or touch pad, may collect touch operations on or near it by a user (such as operations on or near the touch-sensitive surface 630a by a user using a finger, a stylus or other suitable objects or accessories), and drive a corresponding connection device according to a preset program. Optionally, the touch-sensitive surface 630a may include a touch detection device and a touch controller. The touch detection device detects a touch orientation of a user, and detects signals of the touch operation to transmit the signals to the touch controller. The touch controller receives the touch information from the touch detection device, converts the touch information into coordinates of a touch point, and then transfers the coordinates to the processor 680. The touch controller may further receive and execute commands from the processor 680. In addition, the touch-sensitive surface 630a may be realized by various touch-sensitive technical types, such as resistive type, capacitive type, infrared light type and surface acoustic wave type. In addition to the touch-sensitive surface 630a, the inputting unit 630 may include other inputting devices 630b. Specifically, other inputting devices 630b may include but are not limited to one or more of a physical keyboard, a function key (such as a volume control button and a switch button), a trackball, a mouse, an operating rod and the like.

The display unit 640 may be configured to display information input by a user or information provided to the user or various graphical user interfaces of the terminal 600. The graphical user interfaces may include graphics, texts, icons, videos and any combination thereof. The display unit 640 may include a display panel 640a. Optionally, the display panel 640a may be configured in the form of an LCD (Liquid Crystal Display), an OLED (Organic Light-Emitting Diode) or the like. Further, the touch-sensitive surface 630a may cover the display panel 640a. On detection of a touch operation on or near the touch-sensitive surface 630a, the touch operation is transmitted to the processor 680 to determine the type of the touch event, and then the processor 680 provides a corresponding visual output on the display panel 640a based on the type of the touch event. Although the touch-sensitive surface 630a and the display panel 640a are shown in FIG. 7 as two separate components for realizing an input and an output function, the touch-sensitive surface 630a in some embodiments may be integrated with the display panel 640a to realize the input and output function.

The terminal 600 may further include at least one sensor 650, such as a light sensor, a motion sensor and other sensors. Specifically, the light sensor may include an ambient light sensor and a proximity sensor. The ambient light sensor may adjust the brightness of the display panel 640a according to the brightness of the ambient light, and the proximity sensor may close the display panel 640a and/or back light when the terminal 600 is moved near the ear. As a motion sensor, the gravity acceleration sensor may detect the magnitude of acceleration in all directions (typically three axis), and may detect the magnitude and direction of gravity at rest. The gravity acceleration sensor may be applied to applications for identifying the gesture of the mobile phone (such as horizontal and vertical screen switching, related games and magnetometer attitude calibration), vibration identification related functions (such as a pedometer and a tap) and the like. The terminal 600 may be further include other sensors, such as a gyroscope, a barometer, a hygrometer, a thermometer, an infrared sensor and the like, which are not described herein.

An audio circuit 660, a speaker 660a, and a microphone 660b may be configured to provide an audio interface between a user and the terminal 600. The audio circuit 660 may be configured to transfer, to the speaker 660a, an electrical signal which is converted from the received audio data, and then the microphone 660a is configured to convert the electrical signal into a sound signal for outputting. The microphone 660b is configured to convert a collected sound signal into the electrical signal which is to be received by the audio circuit 660 and then converted to audio data. The audio data are outputted to and processed by the processor 680, and then for example transmitted, through the RF circuit 610, to another terminal or outputted to the memory 620 for further processing. The audio circuit 660 may further include a headset jack to provide communication with the terminal 600 for the peripheral headset.

For wireless communication, the terminal is provided with a wireless communication unit 670. The wireless communication unit 670 may be a WiFi module. WiFi is a short-range wireless transmission technology, which provides users with wireless broadband Internet access. Through the wireless communication unit 670, the terminal 600 can help users to send and receive e-mail, browse the web, access to streaming media and the like. Although FIG. 7 shows the wireless communication unit 670, it should be understood that the wireless communication unit 670 is not a necessary component of the terminal 600, and may be omitted without departing from the essence of the disclosure.

The processor 680 is the control center of the terminal 600, and configured to connect various parts of the mobile phone via various interfaces and lines. By operating or executing the software programs and/or modules stored in the memory 620 and calling the data stored in the memory 620, the processor 680 is configured to perform various functions and data processing of the terminal 600, thereby overall monitoring the mobile phone. Optionally, the processor 680 may include one or more processing cores. In some embodiments, the processor 680 may be integrated with an application processor and a modem processor. The application processor mainly processes an operating system, a user interface, an application and the like, and the modem processor mainly processes wireless communications. It is to be understood that, the above-described modem processor may not be integrated into the processor 680.

The terminal 600 further includes a power supply 690 (such as a battery) for supplying power to various components. In some embodiments, the power supply may be logically connected to the processor 680 through a power management system, so as to manage charging, discharging and power consumption management functions via the power management system. The power supply 690 may also include any one or more components, such as a DC power supply or an AC power supply, a recharge system, a power failure detection circuit, a power converter or inverter and a power supply status indicator.

Although not shown, the terminal 600 may also include a camera, a Bluetooth module and the like, which will not be described herein.

The optional structure of the terminal 600 is described in the above in conjunction with the FIG. 10. One or more modules are stored in the memory. When executed by the one or more processors, the one or more modules are configured to obtain a 2D human face image for 3D human face reconstruction, and determine feature points on the 2D human face image, with the feature points being representative of a human face contour, determine posture parameters of a human face by using the feature points, and adjust, based on the posture parameters, a posture of a general 3D human face model obtained in advance, determine points on the general 3D human face model corresponding to the feature points and adjust the corresponding points in a blocking state to obtain a preliminary 3D human face model, perform deformation adjusting on the preliminary 3D human face model to obtain a deformed 3D human face model, so that a positional relationship among the corresponding points on the deformed 3D human face model is consistent with a positional relationship among the feature points on the 2D human face image; and perform texture mapping on the deformed 3D human face model to obtain a 3D human face.

The adjusting the corresponding points in the blocking state to obtain the preliminary 3D human face model includes determining a plane in which the corresponding points in the blocking state are located, with the plane being perpendicular to the longitudinal axis of the human face, determining an intersection track between the plane and the general 3D human face model, and moving the corresponding points to the outermost end of the intersection track.

The performing deformation adjusting on the preliminary 3D human face model includes calculating displacements of the corresponding points on the preliminary 3D human face model with respect to the feature points, with reference to a proportional relation among the feature points on the 2D human face image, constructing an interpolation function, and calculating displacements of other points on the preliminary 3D human face model except the corresponding points based on the interpolation function, and adjusting the preliminary 3D human face model according to the displacements of the corresponding points and the displacements of the non-corresponding points.

The radial basis function is used to construct the interpolation function.

The performing texture mapping on the deformed 3D human face model includes performing the texture mapping by using a similarity-preserving mesh parameterization method.

Based on the 3D human face reconstruction method according to the embodiment of the present disclosure, feature points are determined on an obtained 2D human face image, posture parameters of a human face are determined based on the feature points, and a posture of a general 3D human face model is adjusted based on the posture parameters. Points corresponding to the feature points are determined on the general 3D human face model, and the corresponding points in a blocking state are adjusted by translation to obtain a preliminary 3D human face model. Deformation adjusting is performed on the preliminary 3D human face model, and texture mapping is performed on the deformed 3D human face model to obtain a final 3D human face. The obtained 2D human face image in the present disclosure may be a side human face image, posture parameters of the side human face image are determined based on feature points, a posture of a general 3D human face model is adjusted to make the posture of the general 3D human face model consistent with a posture of a human face, and a 3D human face is obtained through subsequent processing. Since a shooting angle of a 2D image is not limited in the present disclosure, the robustness is high, and the accuracy of face recognition is further improved.

It should be noted that, in the present disclosure, the relational terms, such as first and second or the like, are used merely to distinguish one entity or operation from another entity or operation, without necessarily requiring or implying that any such actual relations or orders exist among the entities or operations. Moreover, terms such as, "including", "comprising", or any other variation thereof, are intended to cover a non-exclusive inclusion, such that a process, a method, an article, or an apparatus including a series of elements may not only include those elements, but include other elements not expressly listed or inherent to the process, the method, the article, or the apparatus. Without more constraints, an element preceded by "includes a . . . " does not preclude the existence of additional identical elements in the process, the method, the article, or the apparatus that includes the element.

The embodiments of the present disclosure are described in a progressive manner and each embodiment places emphasis on the difference from other embodiments. Therefore, one embodiment can refer to other embodiments for the same or similar parts.

According to the above description of the disclosed embodiments, the present disclosure can be implemented or used by those skilled in the art. Various modifications made to these embodiments may be obvious for those skilled in the art, and a normal principle defined in the present disclosure may be implemented in other embodiments without departing from the spirit or scope of the present disclosure. Therefore, the present disclosure is not limited to the embodiments described herein but confirms to a widest scope in accordance with principles and novel features disclosed in the present disclosure.

What is claimed is:

1. A three-dimensional (3D) human face reconstruction method, comprising:
    obtaining a two-dimensional (2D) human face image for 3D human face reconstruction, and determining feature points on the 2D human face image, wherein the feature points are representative of a human face contour;
    determining posture parameters of a human face by using the feature points, and adjusting, based on the posture parameters, a posture of a general 3D human face model obtained in advance;
    determining points on the general 3D human face model corresponding to the feature points, and adjusting corresponding points in a blocking state to obtain a preliminary 3D human face model;
    performing deformation adjusting on the preliminary 3D human face model to obtain a deformed 3D human face model, so that a positional relationship among the corresponding points on the deformed 3D human face model is consistent with a positional relationship among the feature points on the 2D human face image; and
    performing texture mapping on the deformed 3D human face model to obtain a 3D human face,
    wherein adjusting the corresponding points in the blocking state to obtain the preliminary 3D human face model comprises:
        determining a plane in which the corresponding points in the blocking state are located, the plane being perpendicular to the longitudinal axis of the human face;
        determining an intersection track between the plane and the general 3D human face model; and
        moving the corresponding points to the outermost end of the intersection track, and
    wherein the method is performed by one or more processors.

2. The method according to claim 1, wherein performing deformation adjusting on the preliminary 3D human face model comprises:
    calculating displacements of the corresponding points on the preliminary 3D human face model with respect to the feature points, with reference to a proportional relation among the feature points on the 2D human face image;
    constructing an interpolation function, and calculating displacements of other points on the preliminary 3D human face model except the corresponding points based on the interpolation function; and
    adjusting the preliminary 3D human face model according to the displacements of the corresponding points and the displacements of the non-corresponding points.

3. The method according to claim 2, wherein constructing the interpolation function comprises constructing the interpolation function by using the radial basis function.

4. The method according to claim 1, wherein performing texture mapping on the deformed 3D human face model comprises performing the texture mapping by using a similarity-preserving mesh parameterization method.

5. A three-dimensional (3D) human face reconstruction apparatus, comprising:
    one or more processors configured to:
        obtain a two-dimensional (2D) human face image for 3D human face reconstruction, and determine feature points on the 2D human face image, wherein the feature points are representative of a human face contour;
        determine posture parameters of a human face by using the feature points, and adjust, based on the posture parameters, a posture of a general 3D human face model obtained in advance;
        determine points on the general 3D human face model corresponding to the feature points, and adjust corresponding points in a blocking state to obtain a preliminary 3D human face model;

perform deformation adjusting on the preliminary 3D human face model to obtain a deformed 3D human face model, so that a positional relationship among the corresponding points on the deformed 3D human face model is consistent with a positional relationship among the feature points on the 2D human face image; and perform texture mapping on the deformed 3D human face model to obtain a 3D human face, wherein the one or more processors are further configured to:

determine a plane in which the corresponding points in the blocking state are located, the plane being perpendicular to the longitudinal axis of the human face;

determine an intersection track between the plane and the general 3D human face model; and move the corresponding points to the outermost end of the intersection track.

6. The 3D human face reconstruction apparatus according to claim 5, wherein the one or more processors are further configured to:

calculate displacements of the corresponding points on the preliminary 3D human face model with respect to the feature points, with reference to a proportional relation among the feature points on the 2D human face image;

construct an interpolation function, and calculate displacements of other points on the preliminary 3D human face model except the corresponding points based on the interpolation function; and adjust the preliminary 3D human face model according to the displacements of the corresponding points and the displacements of the non-corresponding points.

7. The 3D human face reconstruction apparatus according to claim 6, wherein the interpolation function is constructed by using the radial basis function.

8. The 3D human face reconstruction apparatus according to claim 5, wherein the texture mapping is performed on the deformed 3D human face model based on similarity-preserving mesh parameterization.

9. A server, comprising a three-dimensional (3D) human face reconstruction apparatus, the 3D human face reconstruction apparatus comprising one or more processors and a memory for storing program instructions that, when executed by the one or more processors, cause the one or more processors to:

obtain a two-dimensional (2D) human face image for 3D human face reconstruction, and determine feature points on the 2D human face image, wherein the feature points are representative of a human face contour;

determine posture parameters of a human face by using the feature points, and adjust, based on the posture parameters, a posture of a general 3D human face model obtained in advance;

determine points on the general 3D human face model corresponding to the feature points, and adjust corresponding points in a blocking state to obtain a preliminary 3D human face model;

perform deformation adjusting on the preliminary 3D human face model to obtain a deformed 3D human face model, so that a positional relationship among the corresponding points on the deformed 3D human face model is consistent with a positional relationship among the feature points on the 2D human face image; and perform texture mapping on the deformed 3D human face model to obtain a 3D human face, wherein the program instructions further cause the one or more processors to:

determine a plane in which the corresponding points in the blocking state are located, with the plane being perpendicular to the longitudinal axis of the human face;

determine an intersection track between the plane and the general 3D human face model; and move the corresponding points to the outermost end of the intersection track.

10. The server according to claim 9, wherein the program instructions further cause the one or more processors to:

calculate displacements of the corresponding points on the preliminary 3D human face model with respect to the feature points, with reference to a proportional relation among the feature points on the 2D human face image;

construct an interpolation function, and calculate displacements of other points on the preliminary 3D human face model except the corresponding points based on the interpolation function; and adjust the preliminary 3D human face model according to the displacements of the corresponding points and the displacements of the non-corresponding points.

11. The server according to claim 10, wherein the interpolation function is constructed by using the radial basis function.

12. The server according to claim 9, wherein the texture mapping is performed on the deformed 3D human face model based on similarity-preserving mesh parameterization.

13. A non-transitory computer readable storage medium, comprising program instructions which, when executed by a processor of a computing device, configure the processor to execute the 3D human face reconstruction method according to claim 1.

* * * * *